United States Patent
Takeo et al.

(10) Patent No.: US 6,854,087 B1
(45) Date of Patent: Feb. 8, 2005

(54) DOCUMENT EDITING APPARATUS

(75) Inventors: Nobuyuki Takeo, Nakai-machi (JP); Hiroshi Katsurabayashi, Nakai-machi (JP); Takashi Noguchi, Nakai-machi (JP); Akira Kurosawa, Nakai-machi (JP); Chihiro Sato, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 863 days.

(21) Appl. No.: 09/587,265

(22) Filed: Jun. 5, 2000

(30) Foreign Application Priority Data

Aug. 10, 1999 (JP) .......................................... 11-226405

(51) Int. Cl.[7] .......................... G06F 15/00; G06F 17/00; G06F 7/00; G06F 17/30; G09G 5/00

(52) U.S. Cl. ........................ 715/526; 715/515; 715/517; 715/530; 707/102; 707/203; 345/700; 345/733

(58) Field of Search ................................. 715/526, 515, 715/517, 530; 707/203, 102; 345/700, 733

(56) References Cited

U.S. PATENT DOCUMENTS 5,999,191 A * 12/1999 Frank et al. ................ 345/634

* cited by examiner

Primary Examiner—Joseph Feild
Assistant Examiner—Chau Nguyen
(74) Attorney, Agent, or Firm—Oliff & Berridge, PLC

(57) ABSTRACT

The invention provides an apparatus for reproducing the state in which an editor has added and described a comment to a document while what description content the editor is viewing so that the intention of the editor is rendered understandable. A document synthesis unit displays a layer on a screen, the document editing unit generates a new layer based on user operation to the document having the component layer displayed on the screen and adds it to the document, and generates at-add-time layer display state information of the layer displayed on the screen at the time of the addition. Layer state managing units manage the at-add-time layer display state information in correlation with the new layer, and when a display designation receiving unit receives a designation that specifies the content added to the document, a layer state reproducing unit controls the document synthesis unit to display the layer that was displayed on the screen when the specified layer was added based on the at-add-time layer display state information.

3 Claims, 4 Drawing Sheets

LAYER

PERMEABLE

GENERATION OF WORK LAYER

DETERMINATION OF WORK LAYER → ADDITION OF LAYER

DOCUMENT EDITING APPARATUS

BACKGROUND OF THE INVENTION

1. Field of the Invention

This invention relates to a document editing apparatus for preparing a document from a plural electronic layer data pieces, and more particularly relates to a document editing apparatus that displays a layer added newly in a document editing process so that the intention of the addition of this layer is understandable on a screen.

2. Description of the Related Art

In some document editing apparatuses for preparing documents from electronic data and for editing prepared documents, plural permeable layers that contain description contents are placed one on another and displayed to thereby prepare a unified document, and a layer is added to the base description to build-up the description content.

FIG. 5 and FIG. 6 show the document editing process concept in the document editing apparatus as described hereinabove.

In detail, as shown in FIG. 5, a document includes plural transparent layers and a user can write arbitrary description on layers. The description contents, which are placed one on another, of the layers are displayed by displaying the layers that are placed one on another on a screen to be thereby displayed on a screen in the form of one document.

Furthermore as shown in FIG. 6, when a user wants to add a new description content such as a comment to a document, a new layer (work layer) is prepared temporarily and a comment is written on the layer, and the new layer is subjected to deterministic operation to be added to the document. Thereby the user can add the new description content to the document.

According to the document editing apparatus as described hereinabove, a user can add a description content desiredly to a document by adding a layer that includes the new description to the document, and can delete a description content of a document desiredly by deleting the existing layer.

Because of the convenience, the document editing apparatus as described hereinabove has been used in the working system in which plural users commonly manage a document and each user edits the common document individually to thereby construct a complete document.

However, in the case of such a conventional document editing apparatus in which layers are added one after another and the description content of the document is edited, the context of the edition cannot be understood and it is difficult to understand the intention of the user (editor) who has edited the description content when someone works on the document afterward. Such difficulty is a problem.

For example, a comment was added to a document, it becomes unclear afterward that the comment was added to a document of what description content, and the intention of the user who has added the comment cannot be understood.

SUMMARY OF THE INVENTION

The present invention has been accomplished to solve the above-mentioned problem, and provides a document editing apparatus that allows a user to understand the intention of the editor by reproducing the description content that the editor has viewed when the editor has added the comment.

The present invention further provides a document editing apparatus that is suitable for cooperatively editing a common document by means of a client sever system.

A document editing apparatus in accordance with the present invention displays a document having the content described in plural permeable layers on a screen by displaying the layers including the description content placed one on another and is served for editing the description content of the document by adding the layer. With respect to the description content (namely, the layer) added to the document, the state of the document when the layer was added is reproduced, and the intention of the editor is thereby rendered understandable.

In detail, in the document editing apparatus in accordance with the present invention, a document synthesis section displays a layer that has been set to be displayed on a screen based on display/non-display setting included in data of each layer, a document editing section generates a new layer based on the user operation and adds the new layer to the document having the component layers displayed on the screen, and generates information of the layer displayed on the screen when the new layer was added as at-add-time layer display state information.

A layer state managing section manages the at-add-time layer display state information in correlation with the added new layer. For example, a display designation receiving section receives a display designation for specifying the description content (namely, the layer) added to the document from a user, and then the layer state reproducing section controls the document synthesis section to display on the screen the layer that was displayed on the screen when the specified layer was added based on the at-add-time layer display state information.

Otherwise, the layer data and the at-add-time layer display state information may be generated and managed as separate data units, or theme information pieces may be generated and managed collectively together as one data unit. In the former case, the layer data and the at-add-time layer display state information may be stored and managed in separate storing units respectively and may be used separately. In the later case, the layer data and the at-add-time layer display state information are stored in the same storing unit as the collective data, and when the screen display state that was displayed when the layer was added is reproduced, only the at-add-time layer display state information portion in the data may be used.

The document editing apparatus in accordance with the present invention is suitably used for a system for editing a common document cooperatively by means of a client server system provided with a client apparatus and a server apparatus connected to each other by way of a communication line. The client apparatus is provided with the document synthesis section, document editing section, display designation receiving section, and layer state reproducing section. The server apparatus is provided with a layer state managing section and a document managing section for exclusively controlling and managing data of each layer.

In the case where the document editing apparatus in accordance with the present invention is applied to such a client server system, in the client apparatus the layer state temporarily storing unit temporarily stores at-add-time layer display state information of each of plural layers added by the document editing section. When the added plural layer data pieces are transmitted to the document managing section and reflected on the document, the layer state temporarily storing section transmits the temporarily stored at-add-time layer display state information to the layer state managing section, and controls the layer state managing section to manage it. As the result, in the case where plural layers are generated in the client apparatus side and these layers are collectively reflected on the document managed by the server apparatus side, the layer state managing section is allowed to manage the at-add-time layer display state information of each layer, and the frequency of communication between the client apparatus and the server apparatus can be reduced.

BRIEF DESCRIPTION OF THE DRAWINGS

A preferred embodiment of the present invention will be described in detail based on the followings, wherein.

DETAILED DESCRIPTION OF PREFERRED EMBODIMENT

An embodiment of the present invention will be described in detail hereinafter with reference to the drawings.

Figure 1:
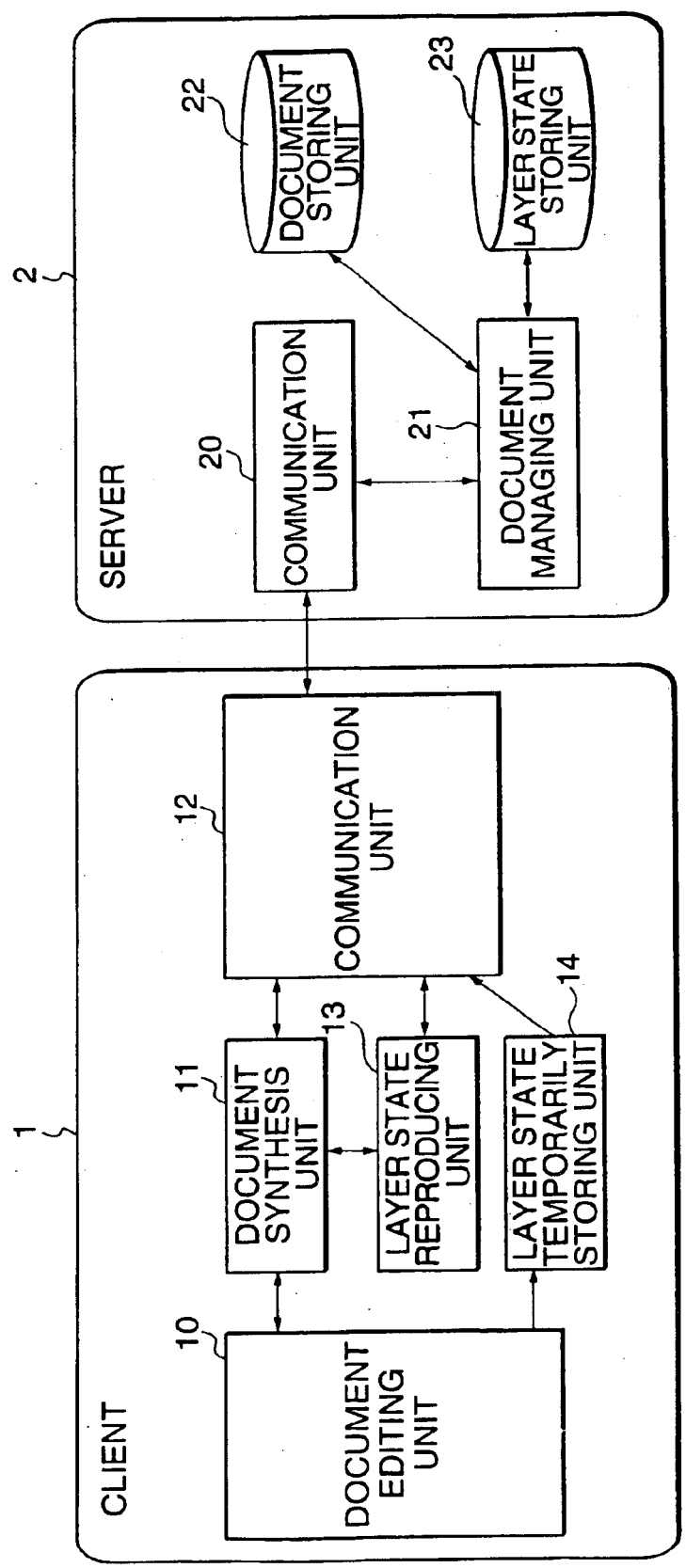
FIG. 1 is a view showing a configuration of a document editing apparatus in accordance with one embodiment of the present invention.

FIG. 1 shown the structure of a document editing apparatus in accordance with this embodiment, this embodiment shows a client server system having a client apparatus 1 and a server apparatus 2 connected to each other by way of a communication line used for editing work in which a common document including plural layers is to be edited cooperatively.

The client apparatus 1 is provided with a document editing unit 10, a document synthesis unit 11, a communication unit 12, a layer state reproducing unit 13, and a layer state temporarily storing unit 14. The server apparatus 2 is provided with a communication unit 20, a document managing unit 21, a document storing unit 22, and a layer state storing unit 23.

These functional units 10 to 14 and 20 to 23 are structured by performing a program in accordance with the present invention by use of the computer hardware resource.

The document editing unit 10 has a function for receiving user inputs from a keyboard and a mouse and has a screen on which a document to be edited is displayed. Furthermore the document editing unit 10 functions to generate and add a new layer that includes the description content to a document having a layer displayed on the screen based on the user operation and functions to generate information of a layer displayed on the screen when the new layer was added as at-add-time layer display state information.

The document editing unit 10 functions also as the display designation receiving section for receiving a display designation for specifying an arbitrary layer from a user.

In this embodiment, the layer data and at-add-time layer display state information are generated as separate data units that are correlated to each other, otherwise the document editing unit 10 may generate these data information pieces as the collected data unit of the layer data that includes the at-add-time layer display state information.

The document synthesis unit 11 displays layers that have been set to be displayed and placed one on another on the screen of the document editing unit 10 based on the display or non-display setting included in the data of each layer as described hereinafter, and the document is thereby presented to a user. The layer data is supplied from the document managing unit 21 of the server apparatus side to the document synthesis unit 11 as described hereinafter.

The client apparatus side communication unit 12 and the server apparatus side communication unit 20 function to communicate the layer data and at-add-time layer display state information to each other by way of a communication line such as local network or Internet.

In this embodiment, the document editing apparatus is structured in the client server style, but the document editing apparatus in accordance with the present invention may be structured on a single computer. In this case, the communication units 12 and 20 for communicating by way of communication line are omitted.

The layer state reproducing unit 13 selects the layer that was displayed on the screen when the specified layer was added from among layer data supplied from the server apparatus side document managing unit 21 based on the at-add-time layer display state information supplied from the server apparatus side document managing unit 21 in response to the specification of the layer received from the display designation receiving section (document editing unit 10), and the layer state reproducing unit 13 controls the document synthesis unit 11 to display it on the screen.

Each of the document storing unit 22 and the layer state storing unit 23 is provided with a writable/readable memory, the document storing unit 22 stores the data of layers of the document correlatively, and the layer state storing unit 23 stores the at-add-time layer display state information of each layer correlatively to the corresponding layer data.

Therefore, in the case where the layer data and the at-add-time layer display state information are combined into a form of collected data unit as described hereinabove, the document storing unit 22 and the layer state storing unit 23 are combined into a single storing unit.

The data of layers that are components of the document and the at-add-time layer display state information in this embodiment will be described hereinafter with reference to FIG. 2.

The document managing unit 21 functions to store the layer data and at-add-time layer display state information supplied from the client apparatus 1 in predetermined correlation in the document storing unit 22 and the layer state storing unit 23. The document managing unit 21 and the layer state storing unit 23 cooperatively constitute the layer state managing section for managing the at-add-time layer display state information in correlation with the layer data. The document managing unit 21 functions to transmit the layer data and the at-add-time layer display state information stored in the document storing unit 22 and the layer state storing unit 23 respectively to the requester client apparatus 1 in response to a request from the client apparatus 1.

In this embodiment in which plural users edit a single document, the document managing unit 21 is provided with exclusive control function for performing deterministic process in which only an authorized user can reflect the edition content on the data in the document storing unit 22 so that the consistency of the document is not destroyed by the edition processing.

The layer state temporarily storing unit 14 of the client apparatus side functions to temporarily store the at-add-time layer display state information of each layer when the document editing apparatus 10 generates plural layer data pieces, and the layer state temporarily storing unit 14 functions also to transmit the at-add-time layer display state information stored temporarily to the layer state managing unit 23 for management when these plural layer data pieces generated to be added are transmitted to the document managing unit 21 and reflected on the stored document.

In other words, in this embodiment, plural layer data pieces generated newly are subjected to deterministic process collectively in the document storing unit 22 in consideration of the circumstance as described hereinafter, and in such a case of collective deterministic process, the at-add-time layer display state information of each layer data piece is stored in the layer state storing unit 23.

Figure 2:
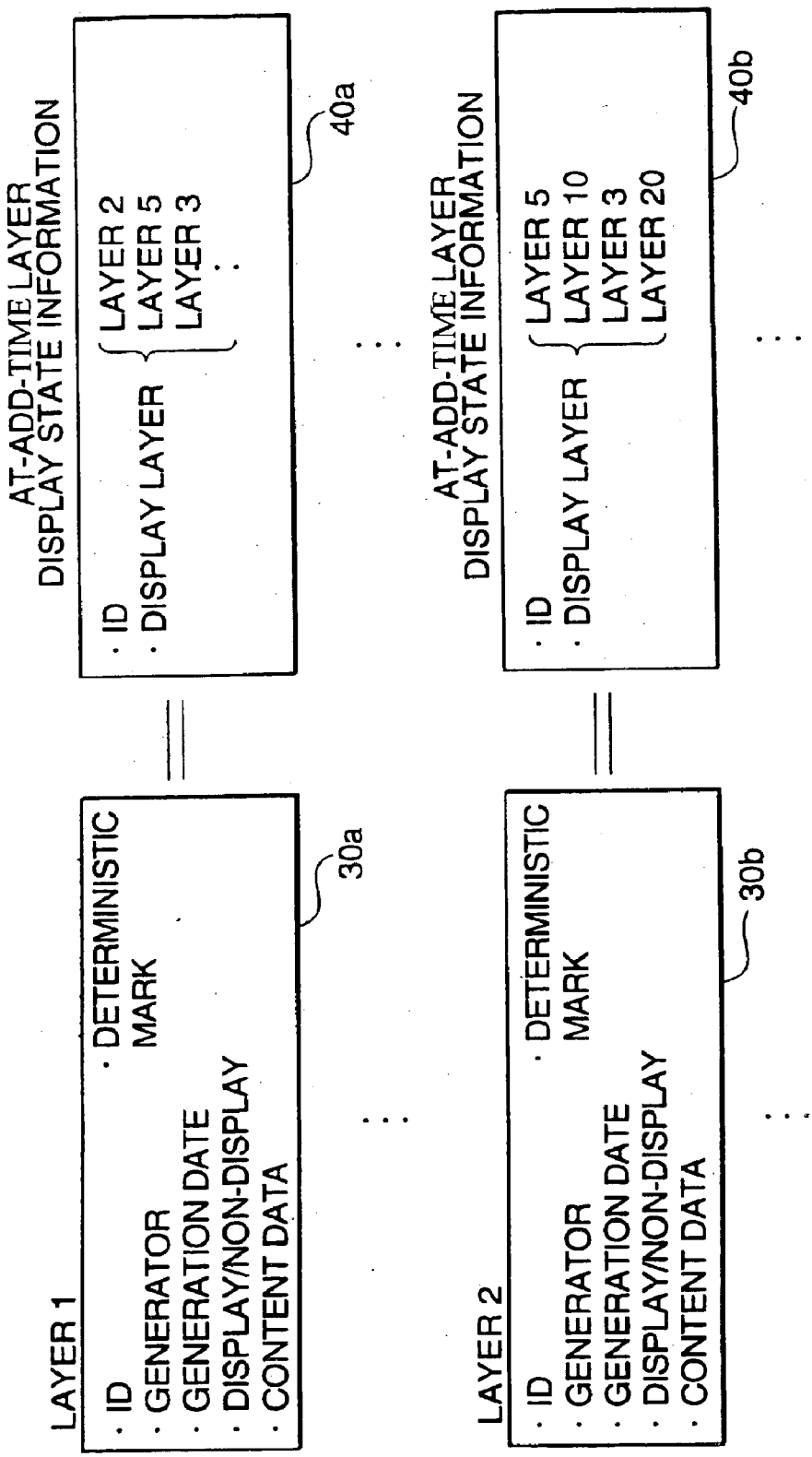
FIG. 2 is a conceptual diagram for illustrating layer data and at-add-time layer display state information.

The data pieces of layers that are components of the document and the at-add-time layer display state information are structured as shown in FIG. 2 in this embodiment.

Each of the layers 30a, 30b, . . . forms a layer unit, and each layer includes ID for identifying the layer uniquely, the name of a user who has prepared the layer, preparation date when the layer has prepared, display/non-display setting information for indicating whether the layer (description content) is displayed on a screen or not, the content data that is the description content described on the layer, and the deterministic mark information for indicating the temporary deterministic state of the description content of the layer.

The layer data pieces that are components of a document are correlated to each other by means of ID, these layers are placed one on another and displayed on a screen, and one document that includes component layers is thereby presented to a user.

The at-add-time layer display state information pieces 40a, 40b, . . . each form a layer unit, each at-add-time layer display state information includes ID for identifying the information uniquely, and the information (for example, layer ID) that specifies other layers that have been displayed on a screen when the corresponding layer is prepared (namely, layers that have existed and have been display set).

These at-add-time layer display state information pieces 40a, 40b, . . . are generated together with the new layer data by the document editing unit 10, and managed in correlation with the corresponding layer data by the document managing unit 21.

In the case where the layer data and the at-add-time layer display state information are generated in the form of collected unit as described hereinabove, the layer data and the correlated at-add-time layer display state information shown in FIG. 2 are combined to form a single data structure.

Next, the editing process by use of the document editing apparatus having the structure described hereinabove will be described. It is assumed that a layer was prepared and then another layer is to be added. The editing apparatus of the present invention can be used to reproduce a document used when the former layer was prepared. However herein, a case where a layer was not displayed on a screen during edition by means of setting of display/non-display is exemplified.

When an existing document is to be edited, the designation (document name or document ID) is entered from the document editing unit 10 to specify an editing target. The designation is transmitted to the document managing unit 21 by way of the communication units 12 and 20 and the communication line, and the document managing unit 21 reads out all the layer data and all the corresponding at-add-time layer display state information that are components of the specified document from the storing units 22 and 23 in response to the reception of the designation and transmits them to the client apparatus 1 by way of the communication line.

In the client apparatus 1, the document synthesis unit 11 places the received layers one on another and registers the position of the layers, and displays the document structured as described hereinabove on the screen of the document editing unit 10.

At that time, the document synthesis unit 11 excludes layers to which non-display is set from the display target, and displays the document that has only the layers to which display is set. The received at-add-time layer display state information is held by the layer state reproducing unit 13, and is used in the layer state reproducing process as described hereinafter.

Next, when a user operates the document editing unit 10 to add a comment with viewing the document displayed on the screen, the document editing unit 10 generates a new layer that includes the description content such as the comment that the user has entered, and performs the process to add the description content to the document displayed on the screen. Simultaneously, the document editing unit 10 generates at-add-time layer display state information corresponding to the layer generated newly this time, and adds the information for specifying the layer that was being displayed on the screen when the description content was added.

When the user enters a deterministic designation to the document editing unit 10, the document to which the new layer has been added (namely plural layer data pieces) and the at-add-time layer display state information are transmitted to the document managing unit 21 by way of the communication line, and the at-add-time layer display state information is stored in the layer state storing unit 23, and the document data to which the new layer has been added is stored in the document storing unit 22, the description content such as the comment added to the common document is reflected.

Figure 3:
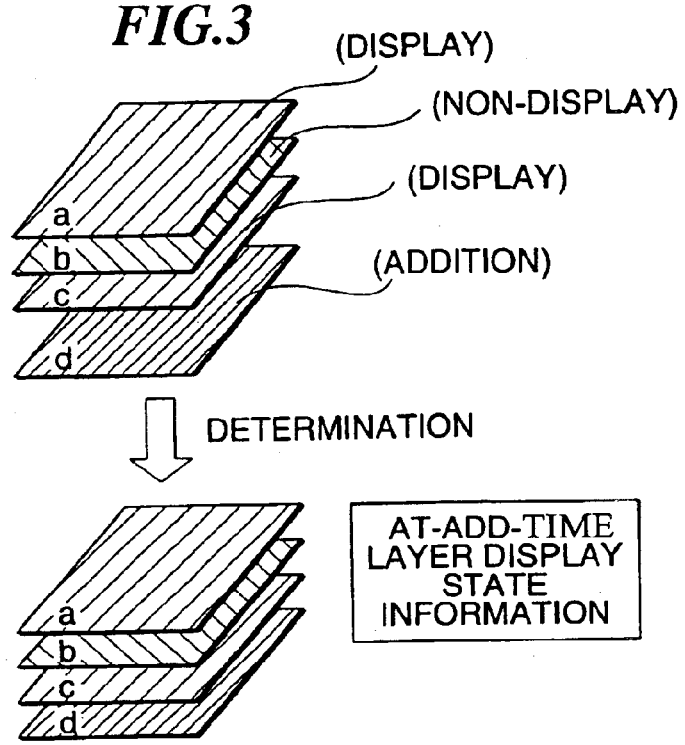
FIG. 3 is a conceptual diagram for describing a layer addition process.

If a part of the layers of the document displayed on the screen is non-display when a new layer is added as described hereinabove, the user adds the comment to the document with no description of non-display layer. For example, as shown in FIG. 3, in the case that a new layer d is to be added to a document having layers a, b, and c, if non-display is set to the layer b, the user adds the layer d with viewing the document with no description content and determines these layer data pieces.

However, the document to which the new layer has been added is perused and edited by other users. It is assumed that non-display setting that has been set to the layer b is canceled later for some reason. When a user views the document afterwards, the document having the layers a, b, c, and d is displayed on the screen to the user.

In such a case, it is difficult to understand the intention of the comment of the user who added the comment from the state in which the document as described hereinabove is displayed. In other words, though the comment was added without viewing the description on the layer b, other users who view the document afterwards recognize the description of the comment in the document that includes also the description of the layer b, and as the result, it is difficult for other users to recognize that the comment was added to what document description.

Figure 4:
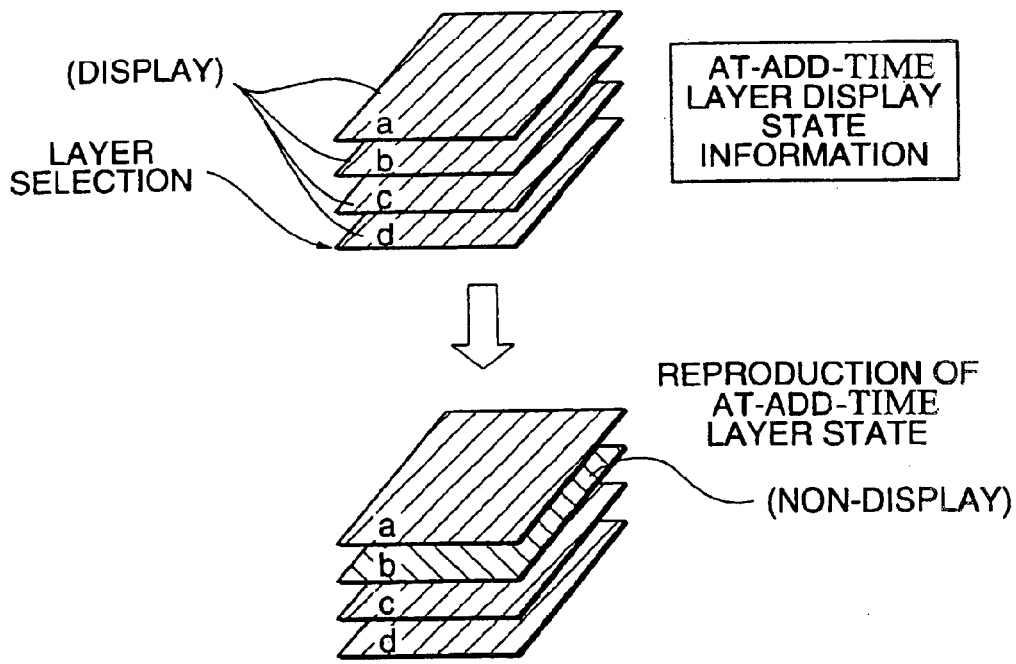
FIG. 4 is a conceptual diagram for describing reproduction process of the layer display state.
Figure 5:
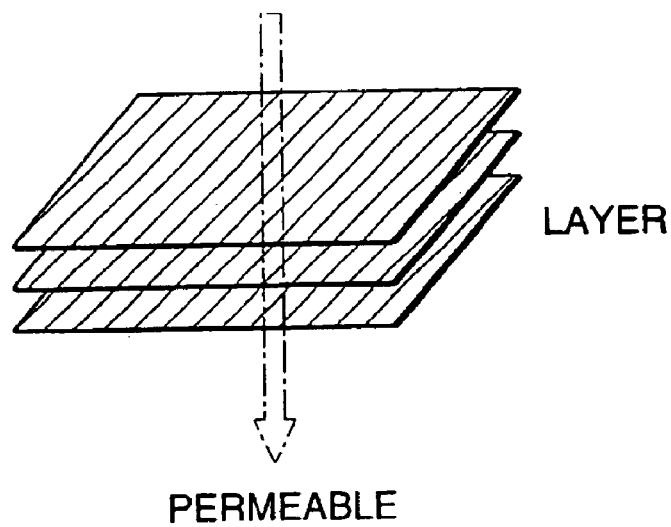
FIG. 5 is a conceptual diagram for describing a document having plural layers.
Figure 6:
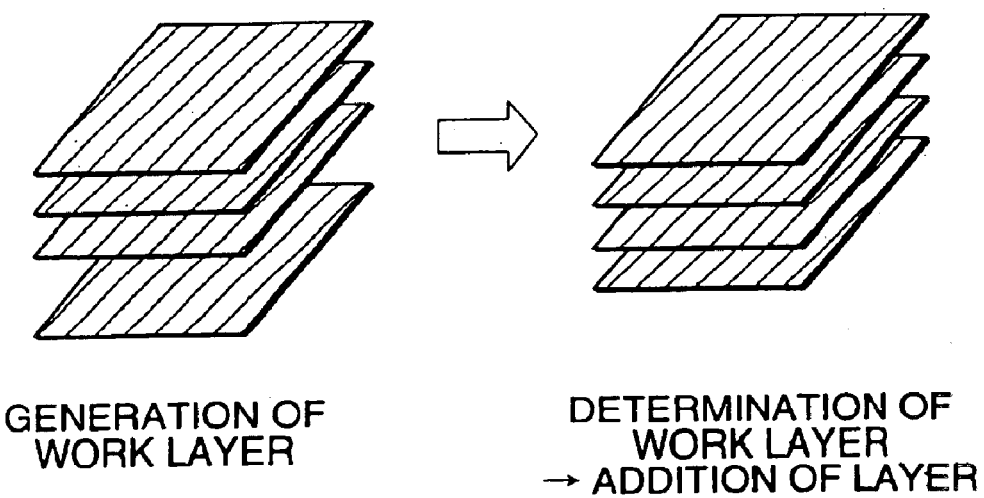
FIG. 6 is a conceptual diagram for describing a layer addition process.

In the document editing apparatus of this embodiment, when a user selects the layer d to which the comment is added from the document editing unit 10 in the state that the document having the layers a, b, c, and d is shown in the screen as shown in FIG. 4, the layer state reproducing unit 13 renders the layer b non-display based on the at-add-time layer display state information of the layer d, and displays on the screen the document having layers a and c, which was displayed on the screen when the layer d was added, and this layer d. The layer d is selected by, for example, a method in which the display portion of the comment is clicked and the document editing unit 10 thereby recognizes the corresponding layer.

Therefore, another user who views later can read the comment in the state that the description content of the document added with the comment is reproduced and can understand the intention of the comment easily.

In the server client system as described in this embodiment, the deterministic operation of a layer involves a style of registration of the layer in the server apparatus 2 (or storage of the whole documents), and involves communication work. In the case where the communication cost is high or connection to the server apparatus is not ready temporarily (the line is not connected because of dial-up), it is necessary to prepare plural work layers collectively and to determine them collectively later. In this case, if the display state that is being displayed when the work layers are determined is applied to all the layers, unique at-add-time layer display state information for each layer cannot be set.

The user can temporarily determine the layer to determine the at-add-time layer display state by use of the apparatus of this embodiment though does not (cannot) determine the layer.

In this operation, a determined mark is marked on the layer data as shown in FIG. 2, and the at-add-time layer display state at that time point is stored temporarily in the layer state temporarily storing unit 14. When the layers are determined collectively after completion of the work, the layers that have been temporarily determined are determined collectively and stored in the document storing unit 22, and on the other hand, the at-add-time layer display state information in the form of temporary determination information is transmitted from the layer state temporarily storing unit 14 to the server apparatus 2 and stored in the layer state storing unit 23.

As described hereinbefore, according to the present invention, because the description state of the document at the addition time point of the layer is reproduced, the state in which a user who edited a document added a comment to the document while viewing what description content can be reproduced, and another user who views the document later can easily understand the intention of the former user who added the comment.

Furthermore, according to the present invention, in a system for editing a common document cooperatively by use of a client server system, the document description state at the time of addition of a layer can be reproduced without increment of communication cost.

What is claimed is:

1. A document editing apparatus for displaying on a screen a document comprising a content described in plural permeable layers by displaying the permeable layers one on another on the screen, the apparatus comprising:

document synthesis means for displaying the permeable layers that have been set to be displayed on the screen based on display/non-display setting included in data of each layer;

document editing means for generating a new permeable layer based on a user entry of comments among multiple user entries and adding thereof to the document which includes the permeable layers displayed on the screen, and for generating, when the new permeable layer is added, information of the permeable layers displayed on the screen as layer display state information at the time of adding the new permeable layer, the new permeable layer including deterministic mark information for indicating a temporary layer display state information based on the user entry to the document editing means;

layer state managing means for managing the layer display state information in correlation with the new added permeable layer;

display designation receiving means for receiving a display designation for specifying an arbitrary layer from the user; and layer state reproducing means for controlling the document synthesis means to display the permeable layers displayed on the screen when the new permeable layer was added based on the layer display state information at the time of adding the new permeable layer in response to reception of the layer specification from the display designation receiving means, wherein the state of the document, when the specified permeable layer was added, is reproduced.

2. The document editing apparatus according to claim 1, wherein the document editing apparatus comprises a client apparatus and a server apparatus connected to each other by way of a communication line, and wherein the client apparatus comprises the document synthesis means, the document editing means, the display designation receiving means, and layer state reproducing means, and the server apparatus comprises the layer state managing means and document managing means for managing data of each permeable layer.

3. The document editing apparatus according to claim 2, wherein the client apparatus further comprises layer state temporarily storing means for temporarily storing layer display state information of each of plural permeable layers added by the document editing means, transmitting the temporarily stored layer display state information to the layer state managing means when the added plural permeable layer data pieces are transmitted to the document managing means and reflected on the document, and controlling the layer state managing means to manage it.

* * * * *